United States Patent Office 3,529,994
Patented Sept. 22, 1970

3,529,994
PAPER COATED WITH PIGMENT COMPRISED OF COPRECIPITATED $CaHPO_4 \cdot 2H_2O$ AND $CaSO_4 \cdot 2H_2O$
Arthur M. Brooks, Baltimore, Md., assignor to W. R. Grace & Co., Clarksville, Md., a corporation of Connecticut
No Drawing. Original application May 3, 1968, Ser. No. 726,595, now Patent No. 3,445,259, dated May 20, 1969. Divided and this application Dec. 27, 1968, Ser. No. 803,509
Int. Cl. D21h 1/22
U.S. Cl. 117—152                                    3 Claims

ABSTRACT OF THE DISCLOSURE

A pigment composition comprising coprecipitated calcium hydrogen phosphate dihydrate and calcium sulfate dihydrate, and a process for preparing this composition from calcium hydroxide, sulfuric acid, and phosphoric acid. The coprecipitated pigment is coated on a paper base.

---

This application is a division of application Ser. No. 726,595 filed May 3, 1968, now Pat. No. 3,445,259, granted May 20, 1969, which is a continuation-in-part of U.S. 453,512, filed May 5, 1965 which in turn is a continuation-in-part of U.S. 221,678, filed Sept. 5, 1962 and now abandoned.

The composition of this invention is a pigment consisting essentially of particles of a coprecipitate of $CaHPO_4 \cdot 2H_2O$ and $CaSO_4 \cdot 2H_2O$ having an average size within the range of from 0.01 to 10 microns and aqueous suspensions containing these particles wherein the molar ratio of $CaHPO_4 \cdot 2H_2O$ to $CaSO_4 \cdot 2H_2O$ range from 1:1 to 1:9.

One embodiment of the invention is a method for preparing $CaHPO_4 \cdot 2H_2O$—$CaSO_4 \cdot 2H_2O$ pigment slurries and dry pigments comprising the steps of (1) mixing an aqueous slurry containing from 1 to 35 weight percent calcium hydroxide with a phosphoric acid solution containing from 85 to 1 weight percent phosphoric acid to form an aqueous suspension containing particles of calcium hydrogen phosphate, (2) mixing the suspension with an aqueous sulfuric acid solution containing 96 to 1 weight percent sulfuric acid to form an acidic suspension containing calcium sulfate particles and phosphoric acid, (3) and mixing the acidic suspension with calcium hydroxide to form an aqueous suspension containing coprecipitated particles of $CaHPO_4 \cdot 2H_2O$ and $CaSO_4 \cdot 2H_2O$, wherein the molar ratio of $CaHPO_4 \cdot 2H_2O$ to $CaSO_4 \cdot 2H_2O$ is from about 1:1 to 1:9. The dry powder can be prepared by separating the particles from the reaction mixture and drying the particles at temperatures below 75° C. to form dry particles of coprecipitated $CaHPO \cdot 2H_2O$ and $CaSO_4 \cdot 2H_2O$.

Another embodiment of the invention is a method for preparing a coprecipitate of $CaHPO_4 \cdot 2H_2O$ and $$CaSO_4 \cdot 2H_2O$$

comprising the steps of mixing an aqueous slurry containing from 1 to 35 weight percent calcium hydroxide with an aqueous solution of phosphoric acid and sulfuric acid having an acid concentration of from 90 to 1 weight percent to form an aqueous suspension of coprecipitated $CaHPO_4 \cdot 2H_2O$ and $CaSO_4 \cdot 2H_2O$ particles in the desired molar ratio of 1:1 to 1:9. The dried powder can be obtained from the slurry by drying at temperatures below 75° C.

In many manufacturing processes for making paper, paint, rubber, textiles and plastics, insoluble inorganic compounds are used as a pigment, filler, loading material, or coating to impart desirable properties to the final product of which it becomes an integral part. Inorganic compounds are used in this manner to provide improved whiteness, brightness, opacity, covering power, surface characteristics such as smoothness and gloss, surface receptivity for printing inks and coating materials, strength, bulk or compactness, and wear resistance. These inorganic compounds are referred to herein collectively as pigments. These pigments impart their properties by their physical presence and do not undergo substantial chemical changes when they are incorporated into other compositions. This invention relates to pigments which are white or substantially white in color.

A wide variety of white pigments are in common use. Among the naturally occurring pigments are clay, ground limestone, chalk, talc, and diatomaceous earth. Artificially precipitated pigments of this type include titanium dioxide, calcium carbonate, various silicas and silicates, barium sulfate, zinc oxide, lead oxide, and the like. Each of these pigments imparts characteristic specific properties upon which its use in a particular application depends.

The white pigments most commonly used in paper coating processes are clays and calcium carbonate. Clays, the least expensive of the coating materials, provides good opacity and gloss but poor brightness and ink receptivity. Calcium carbonate provides good brightness and ink receptivity. Therefore, calcium carbonate pigments are often used in conjunction with clays to improve the brightness and ink receptivity of the paper coating.

However, calcium carbonate pigments reduce some of the superior properties of the clay pigments with which they are mixed, such as gloss. Furthermore, the calcium carbonate pigments are chemically reactive with acids in contrast to the relatively inert clays. The latter deficiency creates problems when the coated paper waste or "broke" is recycled for use in the manufacture of paper and mixed with additional fibers to form the paper. The coating materials are unavoidably introduced into the paper pulp. When aluminum sulfate is added to the paper pulp to lower the pH and precipitate sizing and other materials on the fibers, the calcium carbonate reacts with the aluminum sulfate and makes adequate pH control of the system during paper formation very difficult.

It is an object of this invention to provide a superior class of pigments slurries and dry pigments having a different composition from those previously known.

It is another object of this invention to produce a composition of matter useful as a pigment comprising alkaline earth compounds of phosphate and sulfate ions formed in the presence of each other, by coprecipitation.

It is another object of this invention to produce a composition of matter useful as a pigment comprising $CaHPO_4 \cdot 2H_2O$ and $CaSO_4 \cdot 2H_2O$ in various ratios.

It is another object of this invention to provide a coprecipitated pigment composition which is acid-stable and which provides coatings which have good brightness, opacity, and ink receptivity and a high gloss.

It is yet another object of this invention to produce a pigment of the type described for use in manufacturing paper, paints, textiles, and the like.

Concentrations are herein given as weight percents unless otherwise stated.

The calcium hydroxide employed in the process of this invention may be obtained from either high calcium limestone or dolomite. The calcium hydroxide is obtained by calcining a limestone, preferably by soft burning, and then hydrating or slaking the calcined product with water to form calcium hydroxide. If dolomite is used as the source of calcium hydroxide, a mixture of calcium and magnesium hydroxides are formed in the slaking operation. Preferably, the lime is slaked with a large excess of water over that required to form the hydroxide, with good agitation and under conditions at or near boiling to obtain completely slaked, finely divided hydroxides in a thick suspension. Commercial hydrated limes, i.e. limes which have been treated with just sufficient water to form $Ca(OH)_2$ in substantially dry condition may also be used, and the $Ca(OH)_2$ slurries referred to herein may optionally be prepared by mixing the hydrated lime with water rather than slaking quick lime directly in an excess of water. The hydroxides, after dilution, if necessary, are then preferably screened or centrifuged to separate and remove unslaked and foreign particles. The calicum hydroxide or calcium hydroxide magnesium hydroxide suspensions employed in the process should have a concentration of from 1 to 35 and preferably from 20 to 30 percent alkaline earth hydroxide.

The phosphoric acid employed in the process of this invention may be derived by the furnace method which generally yields a pure "food grade" acid or in a wet process from the treatment of phosphate rock with sulfuric acid. It is usually necessary to purify the phosphoric acid obtained by the latter process to remove extraneous materials prior to use. The sulfuric acid employed in the process of this invention can be any commercial sulfuric acid which is free from contaminants and colored materials. While aqueous solutions of these mineral acids are preferred for use in the process of this invention, it is also contemplated that alkali metal salts of the mineral acid may be utilized.

In one preferred process for producing the pigments of this invention, alkaline earth hydrogen phosphate is formed by reacting alkaline earth hydroxide, preferably calcium hydroxide with phosphoric acid. In this step, an aqueous suspension of calcium hydroxide is mixed with an aqueous solution containing from 1 to 85 and preferably 15 to 85 percent phosphoric acid in the stoichiometric quantities required to form calcium hydrogen phosphate. The calcium hydroxide to phosphoric acid mole ratio provided in the reaction mixture should therefore be about 1:1. The reaction mixture should be maintained at a temperature within the range of from 0 to 90° C., and suitable provisions for heating or cooling the reaction mixtures should therefore be provided. The calcium hydrogen phosphate reaction product is a finely divided precipitate. In the next step in this process, an aqueous solution containing from 1 to 96 and preferably from 15 to 50 percent sulfuric acid is mixed with the calcium hydrogen phosphate suspension with agitation in stoichiometric quantities to produce a calcium sulfate reaction product. The sulfuric acid to calcium hydrogen phosphate mole ratio should therefore be about 1:1. The reaction products of this reaction are a finely divided calcium sulfate precipitate and phosphoric acid. The temperature of the reaction mixture should be maintained within the range of from 0 to 90° C. in this step. Then a stoichiometric quantity of an aqueous suspension of an alkaline earth hydroxide, preferably calcium hydroxide, is mixed with the calcium sulfate suspension to form calcium hydrogen phosphate. The quantity of the calcium hydroxide slurry added should be sufficient to provide one mole of calcium hydroxide per mole of phosphoric acid in the suspension. The calcium hydroxide slurry can be added until the calcium sulfate suspension is completely neutralized. In this step, calcium phosphate is precipitated in a finely divided condition in the presence of the calcium sulfate particles to form a suspension of coprecipitated particles of

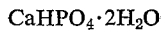

$CaHPO_4 \cdot 2H_2O$ and $CaSO_4 \cdot 2H_2O$.

The dry powders can be separated from the suspension by filtration, centrifugation, or the like. The separated solids are preferably washed with water and are then dried to form the final pigment. The particles are dried at a temperature below 75° C. and preferably from 50 to 70° C. If the pigment is dried at temperatures of 80° C. and higher, a calcium sulfate hemihydrate is formed which sets to a hard composition when contacted with water.

In another preferred process of this invention, the alkali earth hydroxides, preferably calcium hydroxide, are reacted directly with a mixture of phosphoric acid and sulfuric acid to form a calcium hydrogen phosphate and calcium sulfate coprecipitate. By this method, an aqueous suspension of the calcium hydroxide, as described above, is mixed in stoichiometric quantities with an aqueous solution containing predetermined quantities of phosphoric acid and sulfuric acid. The concentration of the acid in the solution can be from 1 to 90 and is preferably about 25 percent. Two moles of calcium hydroxide are employed in the reaction mixture for every mole of the mixture of phosphoric acid and sulfuric acid added thereto. The precipitate can be screened, separated from the reaction mixture, washed, and dried as described above. The dried product of the coprecipitation process is $CaHPO_4 \cdot 2H_2O$ in combination with $CaSO_4 \cdot 2H_2O$ in the desired proportions.

In still another preferred process of this invention, the alkali earth hydroxide, preferably calcium hydroxide, is reacted with phosphoric acid to form precipitated calcium hydrogen phosphate particles, and additional $Ca(OH)_2$ is is reacted with sulfuric acid in the presence of the calcium hydrogen phosphate particles to form a particulate calcium hydrogen phosphate and calcium sulfate coprecipitate. By this method, an aqueous suspension of the calcium hydroxide, as described above, is mixed in calculated quantities with an aqueous solution containing from 1 to 85 and preferably from 15 to 85 percent phosphoric acid. A suspension containing particles of calcium hydrogen phosphate is formed. The suspension is then mixed with predetermined quantities of an aqueous solution containing from 1 to 96 and preferably about 15 to 50 percent sulfuric acid and additional predetermined quantities of calcium hydroxide to form a calcium sulfate precipitate in the presence of the calcium hydrogen phosphate particles. The calcium hydroxide slurry and sulfuric acid solution are added to the calcium hydrogen phosphate suspension at such a rate that a pH greater than 4.0 is maintained during the reaction, whereby destruction of the calcium hydrogen phosphate particles is avoided. As in each of the embodiments described, temperature control of the reaction mixture to within the range of from 0 to 90° C. is desirable.

The processes of this invention have been described above using calcium hydroxide as the alkali metal hydroxide. Alkali earth hydroxides obtained from dolomitic lime, which contains a substantial quantity of magnesium oxide, can also be employed in the processes of this invention. If such a lime source is used, the final pigment product will contain both calcium and magnesium hydrogen phosphates and calcium sulfate as coprecipitates.

For some applications it is desirable to have the calcium hydrogen phosphate and the calcium coprecipitated sulfate in the product pigment in equal molar proportions. However, for some pigment purposes, it may be desirable that nonequal molar proportions of these components be present in intimate mixture in the final pigment product. In such an event, the stoichiometric quantities of reactants employed in the processes of this invention can be modified to provide the final molar proportions desired in the coprecipitated product pigment.

Thus, the proportions of the lime, phosphoric acid and sulfuric acid used may be adjusted for example to produce a coprecipitated product containing as little as ten mole percent (10%) calcium hydrogen phosphate dihydrate with the remaining ninety mole percent (90%) of the composition comprising calcium sulfate dihydrate. In other words, the desired coprecipitated product may contain 1 to 5 moles calcium hydrogen phosphate dihydrate and 9 to 5 moles calcium sulfate dihydrates. It is generally required however, that no less than 10%, and preferably no less than 20%, calcium hydrogen phosphate dihydrate is contained in the coprecipitate.

The reaction products of the process of this invention are the pigment and water. Therefore, the slurry reaction product can be employed directly without the need of intermediate separating, drying, and reslurrying steps. The paper coatings are applied as aqueous suspensions in the paper industry, and particularly when the pigment is manufactured at the paper coating mill, the suspensions can be advantageously used directly after an appropriate adjustment of the slurry concentration. However, where the pigment is to be shipped to the paper coating mill or where extremely high solids concentrations are desired in the coating slurry, a dry pigment may be preferred.

The pigment composition produced by the processes of this invention comprises a coprecipitate of $$CaHPO_4 \cdot 2H_2O$$

and $CaSO \cdot 2H_2O$. The pigment particles have an average size within the range of from 0.01 to 10 microns. The pigment composition is white in color and is a superior pigment for coating paper giving values superior in gloss to those produced by calcium carbonate. It also provides better values for brightness and ink receptivity than provided by clay, the most commonly used paper coating pigment.

Another significant improvement provided by the composition of this invention is acid resistance. As previously described, calcium carbonate creates serious problems when coated paper waste or "broke" is recycled in the paper manufacturing process. The calcium carbonate reacts with the aluminum sulfate almost universally employed in making the paper, and prevents proper process control. Consequently, elaborate procedures are often employed to remove calcium carbonate from such recycled broke. However, the composition of this invention is not reactive with aluminum sulfate. Therefore, it can be recycled freely without interfering with the paper making process.

This invention is further illustrated by the following specific but non-limiting examples.

EXAMPLE I

This example shows the step-wise method for making the composition of this invention.

A 150 g. portion of a slaked high calcium lime slurry containing 50 g. of lime was prepared. This slurry was introduced into a vessel provided with an agitator. A 72 g. portion of an aqueous 85% phosphoric acid solution was slowly added to the lime slurry. The mixture was agitated until well mixed and had a temperature of 90° C. Then a 137 g. portion of an aqueous 96% sulfuric acid solution was slowly added to the reaction mixture and agitated until well mixed. The temperature of the reaction mixture was 74° C. after this step. Then another 294 g. portion of the slaked lime suspension was slowly added to the reaction mixture and agitated until well mixed. The temperature of the reaction mixture after this step was 60° C. The solids concentration in the reaction mixture was 45%. The reaction product was then screened through a 150 mesh screen, was filtered on a cloth on a suction funnel, and was washed with water. The product was a coprecipitated pigment of 344 g. comprising 33.3% calcium hydrogen phosphate dihydrate and 66.7% calcium sulfate dihydrate.

EXAMPLE II

In this example, a 126 g. quality of a slaked lime slurry containing 42 g. of lime was introduced into a container having a good agitator. A 58 g. portion of an aqueous 85% phosphoric acid solution diluted with 656 ml. of water was slowly added to the container with agitation. Agitation was continued until the components were well mixed, and the reaction mixture temperature reached 52° C. Then about 13 g. of the slaked lime slurry was added to adjust the pH to 7.5, and the temperature of the reaction mixture reached 45° C. The total quantity of lime which had been added up to this stage was stoichiometrically sufficient to form calcium hydrogen phosphate. Then, 135 g. of an aqueous 96% sulfuric acid solution was slowly added to the reaction mixture and mixed well. The reaction mixture temperature reached a temperature of 53° C. and had a final pH of 1.0. Then, 318 g. more of the slaked lime suspension was slowly added to the reaction mixture and agitated until well mixed. The temperature of the reaction mixture reached 45° C., and the pH of the reaction mixture was 3.4 after the lime addition. The pH of the suspension was adjusted to 7.6 with additional slaked lime suspension to provide the stoichiometric quantities necessary to form the composition of this invention. The reaction mixture slurry was then passed through a 150 mesh screen, and was filtered on cloth with suction. A coprecipitated pigment of 344 g. comprising 25% calcium hydrogen phosphate dihydrate and 75% calcium sulfate dihydrate.

EXAMPLE III

This example shows an embodiment of the process of this invention wherein the slaked lime is reacted with a mixed acid.

A 66 g. portion of a slaked lime slurry containing 22 g. lime was introduced into a reaction vessel having good agitation. Then 35 g. of an aqueous 85% phosphoric acid solution was mixed with 173 g. of an aqueous 96% sulfuric acid solution, and the acid mixture was diluted with 400 g. of water. The mixed acid solution was then added slowly to the lime suspension, and the temperature of the reaction was held at 25° C. The reaction mixture was allowed to stand overnight. The final pH of the reaction mixture was 4.3. The reaction mixture was then screened with a 150 mesh screen and filtered on a cloth with suction. The pH of the final pigment slurry was 6.0. The final filter cake was dried overnight at 50° C.

The product was a coprecipitated pigment of 344 g. comprising 15% calcium hydrogen phosphate dihydrate and 85% calcium sulfate dihydrate.

EXAMPLE IV

The coprecipitated pigments prepared in Examples I, II, and III were then tested to determine the paper coating properties. Also, equivalent coatings were made with clay and calcium carbonate. Each pigment was made into a coating color or formula using sufficient starch to give a Dennison wax test about 4.5. The base paper was 45.5 lbs. and the coating applied to the paper was 10 lbs., both on a book paper basis weight (25×38—500). The coated paper was supercalendered, 4 nips at 115° C. and 40 p.s.i.g. The coated papers were tested to determine gloss, opacity, brightness, and ink receptivity by standard paper testing techniques. The test standards employed were those of TAPPI and are designated as gloss, T 424m–45; opacity, T 425m–45; brightness, T 453m–48; Dennison wax test, T 460–49; and ink receptivity, RC–19. The results obtained are shown in Table A which gives comparative values for equivalent coating with clay and calcium carbonate.

TABLE A

| | Percentage | | Coprecipitates | | |
| --- | --- | --- | --- | --- | --- |
| | Clay | Calcium carbonate | Example I | Example II | Example III |
| Gloss | 40.2 | 25.9 | 46 | 48 | 49 |
| Brightness | 77.5 | 84.9 | 84.6 | 84.7 | 85.1 |
| Opacity | 85.9 | 86.9 | 88.3 | 88.4 | 88.5 |
| Ink receptivity | 35.1 | 58.7 | 59.4 | 59.7 | 60.1 |
| Starch | 14 | 19 | 8 | 9 | 10 |

As shown in Table A, the coprecipitates show coating properties superior to clay, and superior to calcium carbonate in all properties except brightness where it is approximately equal.

EXAMPLE V

To illustrate the superiority of the present coprecipitate product over simple physical mixtures of calcium sulfate and calcium acid phosphate, a series of coated paper samples were prepared using both coprecipitated and physical mixtures in varying ratios. The coating was applied in all cases at a rate of 10 lbs. per ream of paper. The coprecipitated material was prepared by using the procedure set forth in Example I. The physical mixtures were prepared by milling the ratios of $CaSO_4 \cdot 2H_2O$ and $CaHPO_4 \cdot 2H_2O$ until an intricate finely divided mixture was obtained. The results are given in Table B below:

TABLE B

| Coating | Gloss | Brightness | Opacity | Smoothness | Ink recpt. |
|---|---|---|---|---|---|
| $CaSO_4 \cdot 2H_2O$ | 52 | 85.4 | 88.6 | 737 | 60.3 |
| $CaHPO_4 \cdot 2H_2O$ | 34 | 84.5 | 88.1 | 865 | 59.1 |
| 50/50 (I and II)[1] | 43 | 84.3 | 87.8 | 993 | 58.2 |
| 50/50 coppt.[2] | 57 | 86.7 | 90.3 | 850 | 59 |
| 75/25 (I and II) | 47 | 84.8 | 88.0 | 930 | 59 |
| 75/25 coppt. | 57 | 87.7 | 90.1 | 958 | 53.6 |
| 90/10 (I and II) | 50.0 | 85.0 | 88.2 | 900 | 59.0 |
| 90/10 coppt. | 56 | 87.6 | 90.2 | 890 | 59.0 |

[1] Physical mixture of 50% $CaSO_4 \cdot 2H_2O$ and 50% $CaHPO_4 \cdot 2H_2O$, etc.
[2] Coprecipitate coating 50% $CaSO_4 \cdot 2H_2O$ and 50% $CaHPO_4 \cdot 2H_2O$, etc.

Obviously, many modifications and variations of this invention as hereinabove set forth may be made without departing from the essence and scope thereof, and only such limitations should be applied as are indicated in the claims.

I claim:

1. A coated paper comprising a paper base and a coating containing a pigment consisting of a coprecipitate of calcium hydrogen phosphate dihydrate and calcium sulphate dihydrate having a particle size of 0.01 to 10 microns, said coprecipitate having a molar ratio of calcium hydrogen phosphate dihydrate to calcium sulphate dihydrate between about 1:1 and about 1:9.

2. The product of claim 1 wherein the calcium hydrogen phosphate dihydrate and calcium sulphate dihydrate are present in a molar ratio of calcium hydrogen phosphate dihydrate to calcium sulphate dihydrate of 1:5.7.

3. The product of claim 1 wherein the calcium hydrogen phosphate dihydrate and calcium sulphate dihydrate are present in a molar ratio of calcium hydrogen phosphate dihydrate to calcium sulphate dihydrate of 1:3.

References Cited

UNITED STATES PATENTS 2,263,656  11/1941  Stutz _____ 106—306 X
2,266,233  12/1941  McCleary _____ 106—306 X WILLIAM D. MARTIN, Primary Examiner
M. R. LUSIGNAN, Assistant Examiner